(12) United States Patent
Kawano

(10) Patent No.: US 12,118,792 B2
(45) Date of Patent: Oct. 15, 2024

(54) SURVEILLANCE CAMERA SYSTEM AND SURVEILLANCE CAMERA CONTROL APPARATUS

(71) Applicant: CANON KABUSHIKI KAISHA, Tokyo (JP)

(72) Inventor: Atsushi Kawano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 17/328,834

(22) Filed: May 24, 2021

(65) Prior Publication Data

US 2021/0279474 A1    Sep. 9, 2021

Related U.S. Application Data

(63) Continuation of application No. 15/706,601, filed on Sep. 15, 2017, now abandoned, which is a
(Continued)

(30) Foreign Application Priority Data

May 17, 2013   (JP) ................................. 2013-105226
Feb. 21, 2014  (JP) ................................. 2014-032158

(51) Int. Cl.
*G06V 20/52*   (2022.01)
*G01S 7/41*    (2006.01)
(Continued)

(52) U.S. Cl.
CPC .............. *G06V 20/52* (2022.01); *G01S 7/415* (2013.01); *G06T 7/246* (2017.01); *G06V 20/53* (2022.01);
(Continued)

(58) Field of Classification Search
CPC .... G06V 20/588; G06V 20/584; G06V 20/58; G06V 20/582; G06V 20/52;
(Continued)

(56) References Cited

U.S. PATENT DOCUMENTS 8,879,789 B1 * 11/2014 Figov ..................... G06T 7/246
                                                             382/103
2009/0096871 A1 * 4/2009 Kuwano ................. H04N 7/185
                                                             348/169
(Continued)

FOREIGN PATENT DOCUMENTS

CN    101604446 A  * 12/2009
JP    2006086707 A *  3/2006
(Continued)

OTHER PUBLICATIONS

Google Translate Machine Translation of foreign priority data JP 2014-052175 to Watanabe US 2017/0017833 A1, translated Nov. 10, 2022, 89 pages. (Year: 2022).*

(Continued)

*Primary Examiner* — Matthew C Bella
*Assistant Examiner* — Dennis Rosario
(74) *Attorney, Agent, or Firm* — Canon U.S.A., Inc. IP Division

(57) ABSTRACT

A surveillance system includes an acquisition unit configured to acquire motion information of an object detected from an image captured by an image capturing unit, an association unit configured to associate a recognition processing result of the object with the motion information, and a determination unit configured to determine, from among a plurality of objects detected from the image captured by the image capturing unit, an object to be subjected to recognition processing based on the recognition result associated with the motion information. Thus, even when a plurality of (Continued)

abnormal regions is simultaneously present in a region to be monitored, face recognition can be efficiently performed.

8 Claims, 13 Drawing Sheets

Related U.S. Application Data continuation of application No. 14/279,020, filed on May 15, 2014, now abandoned.

(51) Int. Cl.
  *G06T 7/246* (2017.01)
  *G06V 20/58* (2022.01)
  *G06V 40/16* (2022.01)
  *H04N 23/61* (2023.01)
  *H04N 23/611* (2023.01)

(52) U.S. Cl.
  CPC ............ *G06V 20/58* (2022.01); *G06V 40/166* (2022.01); *H04N 23/61* (2023.01); *H04N 23/611* (2023.01); *B60W 2554/4044* (2020.02); *B60W 2554/80* (2020.02)

(58) Field of Classification Search
  CPC .. G06V 40/172; G06V 40/173; G06V 10/764; G06V 40/165; G06V 40/20; G06V 40/25; G06V 40/28; G06V 40/23; G06V 20/586; G06V 40/16; G06V 10/25; G06V 40/168; G06V 20/593; G06V 10/70; G06V 40/103; G06V 20/53; G06V 20/54; G06V 40/171; G06V 20/80; G06V 40/174; G06V 2201/05; G06V 2201/06; G06V 40/107; G06V 10/82; G06V 10/7784; G06V 20/59; G06V 40/166; G06V 40/10; G06V 20/60; G06V 20/64; G06V 10/255; G06V 20/69; G06V 20/647; G06T 2207/30232; G06T 7/20; G06T 2207/20101; G06T 2207/30196; G06T 2207/30201; G06T 7/292; G06T 2207/10016; G06T 7/70; G06T 7/246; H04N 23/611; H04N 23/61; H04N 23/695; H04N 23/60; H04N 19/527; H04N 19/513; G06F 18/00; G06F 18/21; G06F 3/017; G06F 2218/00; G06F 16/7837; G06F 16/784; G06K 2207/1012; G06K 7/10792; G08G 1/052; G08G 1/166; G01S 17/58; G01S 7/415; G01S 7/41; G01S 7/539; G01S 13/50; G01S 13/58; G01S 13/04; G01S 13/06; B60W 40/105; B60W 2554/80; B60W 2554/00; B60W 2554/20; B60W 2554/40; B60W 2554/4029; B60W 2554/4042; B60W 2554/4043; B60W 2554/4044; B60W 2554/60; B60W 2554/4049; B60W 2554/803; B60W 2554/804; B60W 2754/10; B60W 2754/40; B60W 2754/50
  See application file for complete search history.

(56) References Cited

U.S. PATENT DOCUMENTS

2014/0016837 A1* 1/2014 Nechyba ................ G06V 40/45
                                                          382/118
2017/0017833 A1* 1/2017 Watanabe ................ H04N 5/77

FOREIGN PATENT DOCUMENTS

JP       2007249298 A   *  9/2007
JP       2010134507 A   *  6/2010

OTHER PUBLICATIONS

Foreign priority data JP 2014-052175 to Watanabe US 2017/0017833 A1, Nov. 4, 2014 [retrieved Nov. 10, 2022], 48 pages. (Year: 2014).*

Search Machine Tranlation of JP 2010-134507 A to Katsumi, Jun. 17, 2010 [retrieved Nov. 10, 2022], 27 pages. (Year: 2010).*

Search machine translation of CN-101604446-A to Tian et al., retrived Apr. 21, 2023, 9 pages. (Year: 2023).*

Search machine translation of JP-2006-086707-A to Mitsuharu, retrieved Apr. 21, 2023,198 pages (Year: 2023).*

Search machine translation of JP-2007-249928-A to Yamamoto, Face Authentication Apparatus and Face Authentication Method, translated Jan. 12, 2024 [retrieved Jan. 12, 2024], 13 pages. (Year: 2024).*

* cited by examiner

FIG. 3

| Object ID | 8 |
| Object ID | 3 |

| Object ID | 1 |
|---|---|
| Creation time | 2009/3/2/12:34:54 |
| Name, ID | Unknown, N/A |
| Direction, Speed(Current) | 200, 3m/s |
| Failure History | [270, 5m/s] |

| Timestamp | 2009/3/2/12:35:02 |
| Timestamp | 2009/3/2/12:35:01 |
| Timestamp | 2009/3/2/12:35:00 |
| Timestamp | 2009/3/2/12:34:59 |

| Timestamp | 2009/3/2/12:34:58 |
|---|---|
| Position | (15, 20) |
| Bounding box | (10, 10), (20, 30) |
| Size | 200 |

| Speed[px/sec] | Point |
|---|---|
| 0~30 | +10 |
| 31~120 | +7 |
| 121~ | +2 |

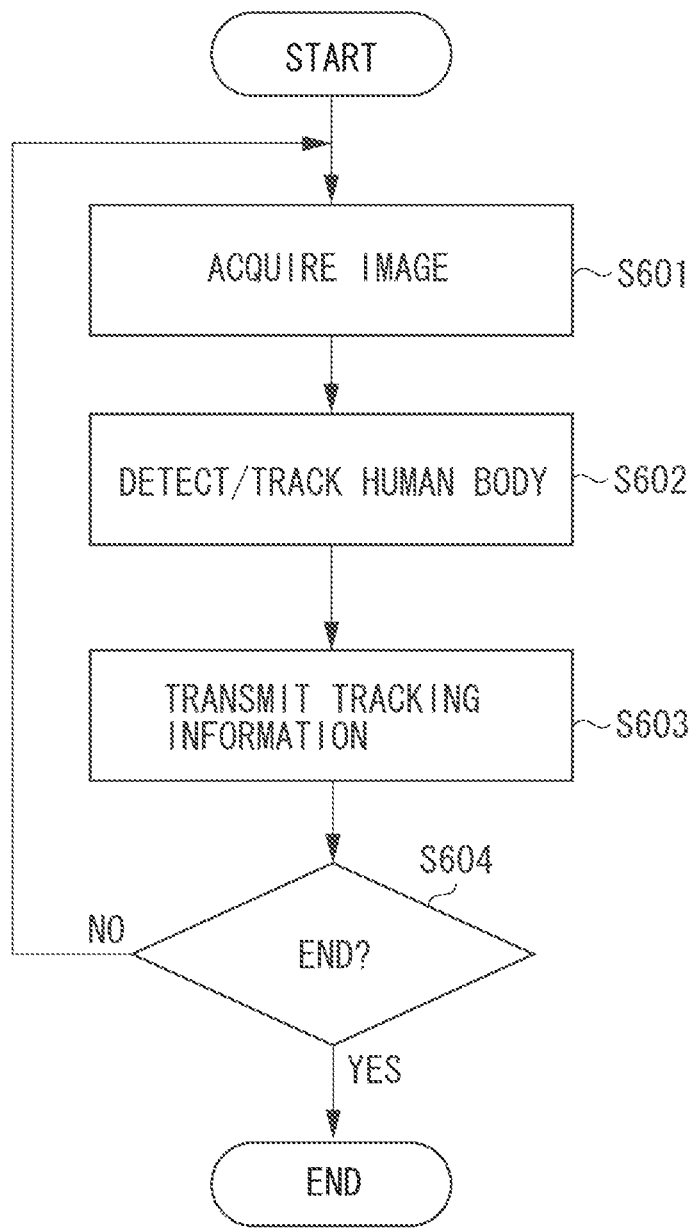

SURVEILLANCE CAMERA SYSTEM AND SURVEILLANCE CAMERA CONTROL APPARATUS

CROSS-REFERENCE TO RELATED APPLICATIONS

This application is a continuation of U.S. patent application Ser. No. 15/706,601, filed Sep. 15, 2017, which is a continuation of U.S. patent application Ser. No. 14/279,020, filed May 15, 2014, which claims the benefit of Japanese Patent Application No. 2013-105226, filed May 17, 2013, and Japanese Patent Application No. 2014-032158, filed Feb. 21, 2014, all of which are hereby incorporated by reference herein in their entirety.

BACKGROUND

Field

Aspects of the present invention generally relate to a surveillance camera system and a surveillance camera control apparatus, and more particularly to a technology suitably used for efficiently recognizing a specific person from an image captured by photographing a surveillance region.

Description of the Related Art

The surveillance camera system is a system that includes a plurality of surveillance cameras, a server configured to process a video of the surveillance camera, and a viewer configured to check the video.

For the surveillance camera, a wide angle camera for photographing a wide region, or a pan-tilt-zoom (PTZ) camera for performing pan-tilt-zoom control by a user's operation is used.

In the surveillance camera system, there is a demand to capture a clear and detailed image by zooming a specific portion or an object in the wide angle of view along with continuous photographing of the wide region.

Japanese Patent Application Laid-Open No. 2008-85832 discusses a surveillance camera system that performs moving object detection, unmoving object detection, or sensor input detection by a fixed camera and photographs an abnormal region by the PTZ camera.

Japanese Patent Application Laid-Open No. 2007-249298 discusses a face recognition apparatus that includes a first camera for photographing an entire region and a second camera for recognizing a face of one person selected as a recognition target from an overall image captured by the first camera through zooming.

In Japanese Patent Application Laid-Open No. 2008-85832, no consideration is given to execution of recognition processing of a person when a plurality of abnormal region is simultaneously present.

In Japanese Patent Application Laid-Open No. 2007-249298, a priority order of face recognition is determined from a face direction or brightness at the point of time when the person is detected by an infrared sensor. However, information obtained at only one point of time may not satisfy a condition suited for face recognition. Consequently, efficient face recognition is not always guaranteed.

SUMMARY

An aspect of the present is directed to efficient execution of face recognition even when a plurality of abnormal region is simultaneously present in a surveillance region.

According to an aspect of the present invention, a surveillance system includes an acquisition unit configured to acquire motion information of an object detected from an image captured by an image capturing unit, an association unit configured to associate a recognition processing result of the object with the motion information, and a determination unit configured to determine, from among a plurality of objects detected from the image captured by the image capturing unit, an object to be subjected to recognition processing based on the recognition result associated with the motion information.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, and together with the description, serve to explain the principles of the disclosure.

FIG. 3 is a diagram illustrating an example of tracking managing information according to the first exemplary embodiment.

FIG. 6 is a flowchart illustrating a processing procedure performed in a wide angle camera according to the first exemplary embodiment.

DESCRIPTION OF THE EMBODIMENTS

Figure 1:
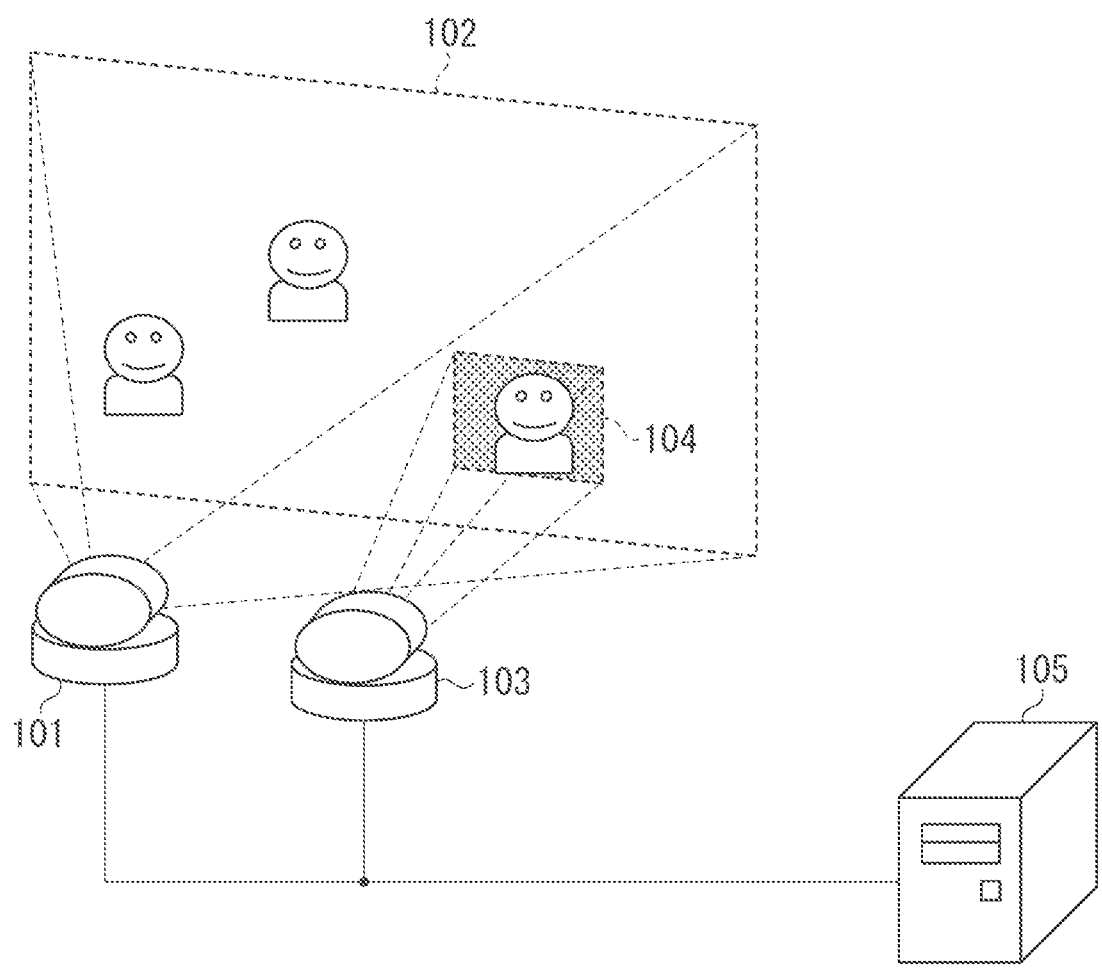
FIG. 1 is a diagram illustrating an example of a surveillance camera system according to a first exemplary embodiment.

FIG. 1 is a diagram illustrating an example of a surveillance camera system according to a first exemplary embodiment. The surveillance camera system includes a wide angle camera 101 for photographing a wide region, a camera 103 (PTZ camera) 103 capable of performing pan-tilt-zoom control, and a sever 105 for controlling the wide angle camera 101 and the PTZ camera 103.

A photographing region of the wide angle camera 101 is a wide angle camera photographing region 102, and a photographing region of the PTZ camera 103 is a PTZ camera photographing region 104. By subjecting the PTZ camera 103 to pan-tilt-zoom control, a part in the wide angle camera photographing region 102 is magnified to be photographed.

Figure 2:
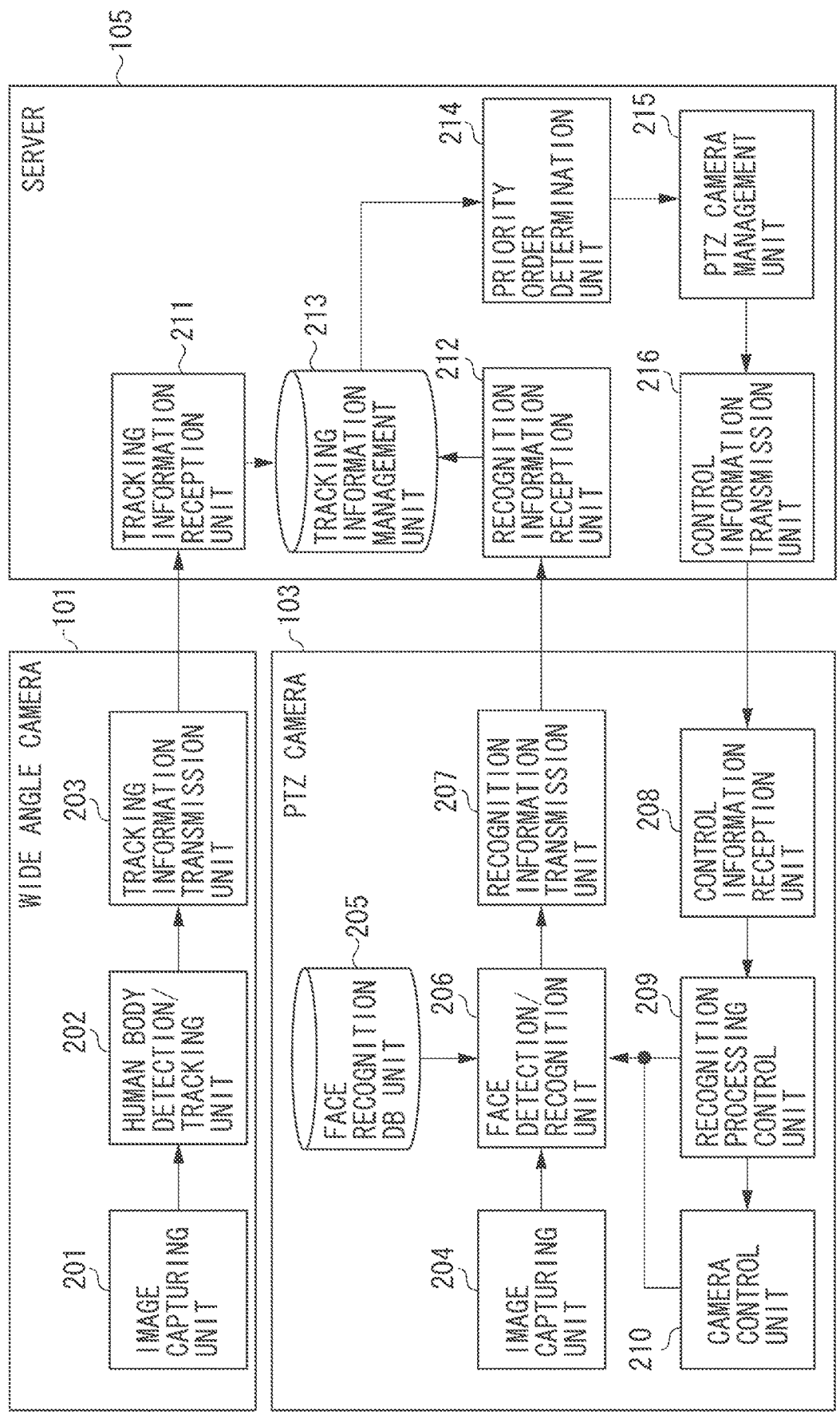
FIG. 2 is a block diagram illustrating a configuration example of the surveillance camera system according to the first exemplary embodiment.

FIG. 2 is a block diagram illustrating a configuration example of the surveillance camera system according to the present exemplary embodiment.

The wide angle camera 101 includes an image capturing unit 201, a human body detection/tracking unit 202, and a tracking information transmission unit 203.

The PTZ camera 103 includes an image capturing unit 204, a face recognition database (DB) unit 205, a face detection/recognition unit 206, a recognition information transmission unit 207, a control information reception unit 208, a recognition processing control unit 209, and a camera control unit 210.

The server 105 includes a tracking information reception unit 211, a recognition information reception unit 212, a tracking information management unit 213, a priority order determination unit 214, a PTZ camera management unit 215, and a control information transmission unit 216, and is configured to control surveillance camera.

In the wide angle camera 101, the image capturing unit 201 captures an image of a surveillance region to create a continuous region image, and adds image identification (ID) for identifying each image to the created region image to output the region image to the human body detection/tracking unit 202.

The human body detection/tracking unit 202 performs pattern matching processing to detect a human body from the captured image of the surveillance region created by the image capturing unit 201, and adds unique human body tracking ID to a human body identified from a positional relationship between frames to perform human body tracking processing.

After completion of the processing, the human body detection/tracking unit 202 outputs tracking information including human body tracking ID unique to each human body, center point coordinates in an image, a width/height and a size of a bounding box, and a moving speed, for each processing execution. The processing of the human body detection/tracking unit 202 is not limited to the pattern matching processing. Any processing may be performed as long as the human body can be detected from the image, for example, human body detection processing using a feature amount based on a luminance gradient/intensity.

The tracking information transmission unit 203 transmits the tracking information output from the human body detection/tracking unit 202 to the server 105 via a network. Through the processing of the tracking information transmission unit 203, the tracking information is transmitted from the wide angle camera 101 to the server. The processing is not limited to any specific communication method such as local area network (LAN) or serial communication.

In the PTZ camera 103, the image capturing unit 204 captures an image of a part of the wide angle camera photographing region 102 to generate an image including a plurality of frames. Image ID for identifying each image is added to the generated image. The image ID does not need to be synchronized with image ID added by the other camera, i.e., the image capturing unit 201 of the wide angle camera 101.

The face recognition DB unit 205 is a database for managing an individual feature amount necessary for recognizing a face as a specific individual. The feature amount and a name of a person corresponding to the feature amount are acquired beforehand from the outside, for example, from the server 105, and set.

The face detection/recognition unit 206 detects a face from the image created by the image capturing unit 204 by pattern matching processing, extracts a feature amount of the face. The face detection/recognition unit 206 compares the feature amount with the feature amount owned by the face recognition DB unit 205 to perform individual face detection recognition processing, and outputs an authentication result. Recognition information including person tracking ID, a moving direction, a moving speed, and a result of a recognition success/failure, and in the case of a success, a position of the face, a name of a recognized individual, and person ID are output for each execution of processing.

The face detection recognition processing of the face detection/recognition unit 206 is performed only when a command to execute recognition processing is received from the recognition processing control unit 209, and is not carried out when there is no recognition processing execution command. No processing is performed during a period from reception of a PTZ control start command from the camera control unit 210 to reception of a PTZ control end command.

The processing of the face detection/recognition unit 206, which detects and recognizes the face from the image, is not limited to the pattern matching processing. A high-speed detection method such as that using a Haar-like feature amount can also be used.

The recognition information transmission unit 207 transmits the recognition information output from the face detection/recognition unit 206 to the server 105 via the network. The processing of the recognition information transmission unit 207, which transmit s the recognition information from the PTZ camera 103 to the server 105, is not limited to any specific communication method such as LAN or serial communication.

The control information reception unit 208 receives, from the server 105, pan-tilt-zoom control information, an execution command of face detection recognition processing, processing target human body tracking ID, a moving direction, and a moving speed.

The recognition processing control unit 209 outputs the recognition processing execution command to the face detection/recognition unit 206 and the pan-tilt-zoom control command to the camera control unit 210 based on the information received by the control information reception unit 208.

The camera control unit 210 performs camera pan-tilt-zoom control based on a pan-tilt-zoom control command from the recognition processing control unit 209. At the time of starting the pan-tilt-zoom control, a PTZ control start command is transmitted to the face detection/recognition unit 206. At the time of ending the pan-tilt-zoom control, a PTZ control end command is transmitted to the face detection/recognition unit 206.

In the server 105, the tracking information reception unit 211 receives tracking information from the wide angle camera 101, and the recognition information reception unit 212 receives recognition information from the PTZ camera 103.

The tracking information management unit 213 manages the tracking information received by the tracking information reception unit 211 and the recognition information received by the recognition information reception unit 212 in association with each other. The tracking information management unit 213 generates authentication processing history including motion information of a person when authentication processing is performed and a result of the authentication processing. Tracking management information 301 illustrated in FIG. 3 is updated.

FIG. 3 illustrates an example of the tracking management information.

The tracking management information 301 manages person tracking information 302 for each person tracking ID. The person tracking information 302 includes person tracking ID, time when a person appears for the first time, a name and person ID of the person, a current moving direction and a moving speed, a moving direction and a moving speed when recognition processing fails, and one or more pieces of positional information 303. Other information such as acceleration speed, a moving pattern, and a moving amount can also be used as motion information.

The positional information 303 includes a position of the person on the image captured by the wide angle camera 101, a width/height and a size of a bounding box, and time of acquiring the information.

The tracking information management unit 213 updates the tracking management information 301 when acquiring each tracking information from the tracking information reception unit 211. Specifically, when tracking information having person tracking ID not managed by the tracking management information 301 is present, new person tracking information 302 is created, and the time of first appearance, the moving direction and the moving speed of the present time, and the positional information 303 are updated. When tracking information having person tracking ID managed by the tracking management information 301 is present, the moving direction and the moving speed of the present time and the positional information 303 are updated.

On the other hand, when no tracking information having person tracking ID managed by the tracking management information 301 is present, corresponding person tracking information 302 is deleted. The tracking information management unit 213 updates the tracking management information 301 when acquiring each recognition information from the recognition information reception unit 212. In this case, when recognition is successful, the name and the person ID of the person are updated. When recognition is a failure, the moving direction and the moving speed at the time of a recognition failure updated.

The priority order determination unit 214 determines a priority order of a person ($Point \cdot human$) subjected to face recognition processing in the PTZ camera 103. The priority order is determined referring to the tracking management information 301 and by a total score of points based on a moving direction (direction) and a moving speed (speed) for each person tracking ID, and a penalty based on failure history in history of authentication processing results. The following expression is a calculation formula for point determination. The higher a score, the higher a priority order.

$$Point_{human} = Point_{direction} + Point_{speed} + Point_{penalty}$$

Figure 4:
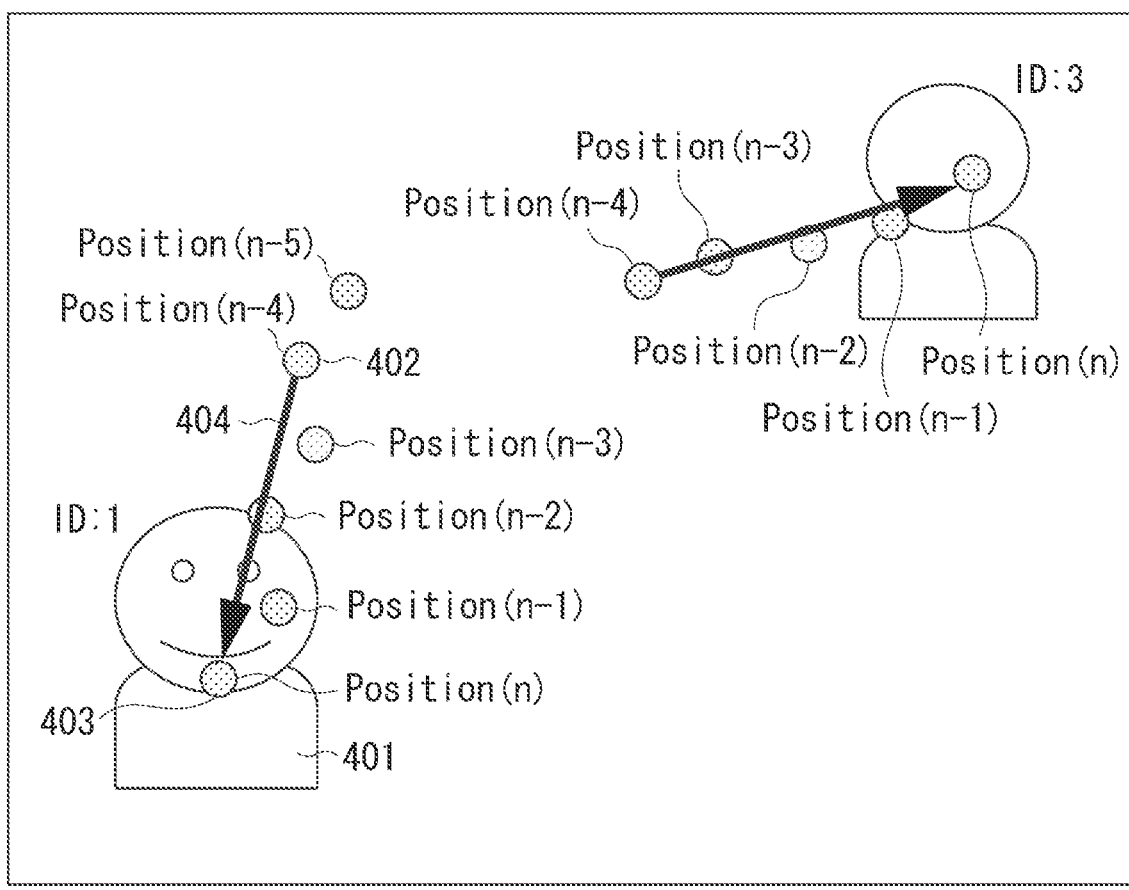
FIG. 4 is a diagram illustrating an example of a method for determining a moving direction and a moving speed according to the first exemplary embodiment.

FIG. 4 illustrates an example of a method for determining a moving direction and a moving speed.

A line segment connecting a past position 402 and a current position 403 of a person 401 on an image is set as a person moving vector 404 in a moving direction. In the present exemplary embodiment, past positional information Position (n-4) is positional information four frames before current positional information Position (n). However, a frame interval is not limited to five frames. A moving speed is determined based on a length of the line segment on the image and required time between two points.

Figures 5A, 5B:
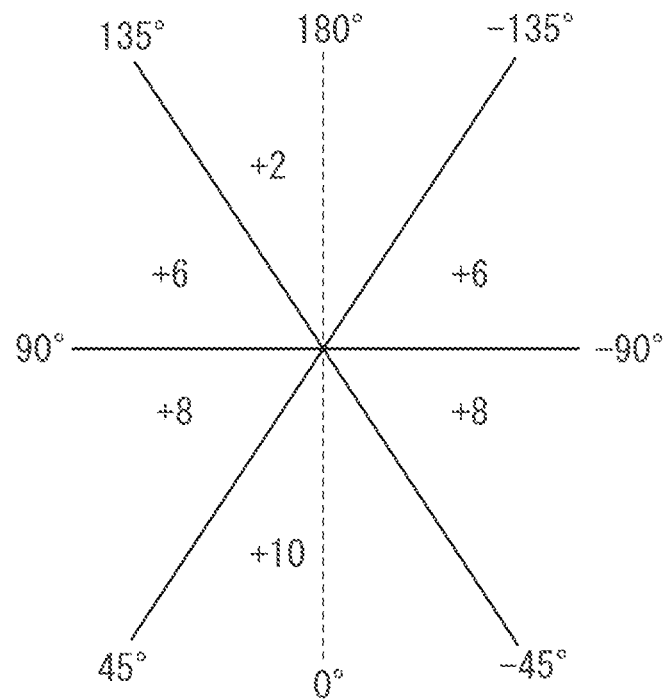
FIG. 5A is a diagram illustrating a point example with respect to the moving direction according to the first exemplary embodiment.
FIG. 5B is a diagram illustrating a point example with respect to the moving speed according to the first exemplary embodiment.

FIG. 5A illustrates a point example with respect to a moving direction, and a point is determined based on the moving direction. In FIG. 5A, in a range of 45° to −45° of a downward moving direction in the image, a point is 10. A point is 8 in a range of 45° to 90° or −45° to −90°. A point is 6 in a range of 90° to 135° or −90° to −135°. A point is 2 in a range of 135° to 180° or −135° to −180°.

FIG. 5B illustrates a point example with respect to a moving speed, and a point is determined based on the moving speed.

A penalty is −3 when a current moving direction is within a range of +3 of a moving direction in failure history. According to the score calculation result, a person unrecognized and having a highest score is subjected to recognition processing at the PTZ camera 103. Setting of a priority order is performed once in a fixed period or after the recognition processing is successful at the PTZ camera 103.

In the present exemplary embodiment, the priority order setting is performed by setting the penalty based on the failure history. However, the priority order setting is not limited to this method. The setting method of the priority order only needs to take a result of last processing into account. A method for setting a priority order based on stability of recognition information in a period where last authentication processing has been executed can be employed.

Specifically, a low priority order is set to a person when his recognition information has been acquired at a fixed or higher than fixed rate among pieces of recognition information acquired from frames in the period where last authentication processing has been executed.

On the other hand, a high priority order is set to a person when his recognition information has been acquired at the fixed or lower than fixed rate. In other words, the high priority order is set to the person showing varied results from each frame.

In the server 105, the PTZ camera management unit 215 manages person tracking ID of a recognition processing target person determined by the priority order determination unit 214, and current positional information. The PTZ camera management unit 215 converts the current positional information into pan-tilt-zoom control information of the PTZ camera 103. The conversion processing into the control information is performed by creating beforehand a conversion table of a position on the image of the wide angle camera 101 and a pan angle, a tilt angle, and a zoom magnification of the PTZ camera. Processing continuation time after outputting of an execution command of recognition processing is measured and managed.

The control information transmission unit 216 transmits the pan-tilt-zoom control information created by the PTZ camera management unit 215, the command to execute the face detection recognition processing, the human body tracking ID of the processing target person, the moving direction, and the moving speed, to the PTZ camera 103 to perform surveillance camera control.

FIG. 6 is a flowchart illustrating a processing procedure performed in the wide angle camera 101.

In step S601, the image capturing unit 201 captures an image. Then, in step S602, the human body detection/tracking unit 202 performs detection and tracking of a human body based on the image.

In step S603, the tracking information transmission unit 203 transmits tracking information that is a result of the human body detection and tracking processing performed by the human body detection/tracking unit 202. In step S604, whether to continue the processing is determined. When the processing is continued (YES in step S604), the processing returns to step S601. When not continued (NO in step S604), the processing is ended.

Figure 7:
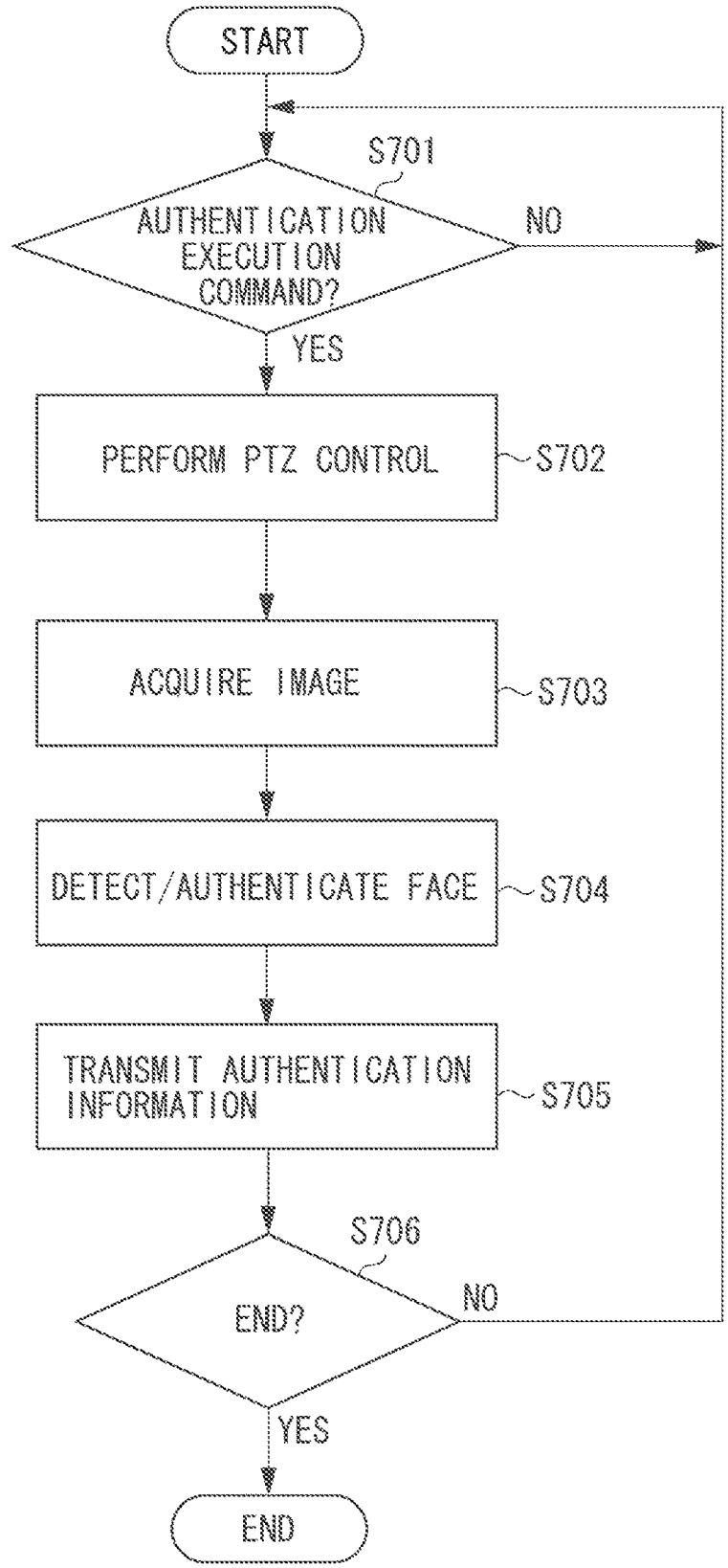
FIG. 7 is a flowchart illustrating an example of processing performed in a PTZ camera according to the first exemplary embodiment.

FIG. 7 is a flowchart illustrating a processing procedure performed in the PTZ camera 103. In step S701, the recognition processing control unit 209 checks presence of a recognition execution command. When the recognition execution command is present (YES in step S701), in step S702, the camera control unit 210 performs pan-tilt-zoom control. In step S703, the image capturing unit 204 an image. Then, in step S704, the face captures detection/recognition unit 206 performs face detection and face authentication processing. In step S705, the recognition information transmission unit 207 transmits a result of the face detection and face authentication performed in step S704 to the server 105.

Lastly, in step S706, whether to continue the processing is determined. When the processing is continued (YES in step S706), the processing returns to step S701. When not continued (NO in step S706), the processing is ended.

Figure 8:
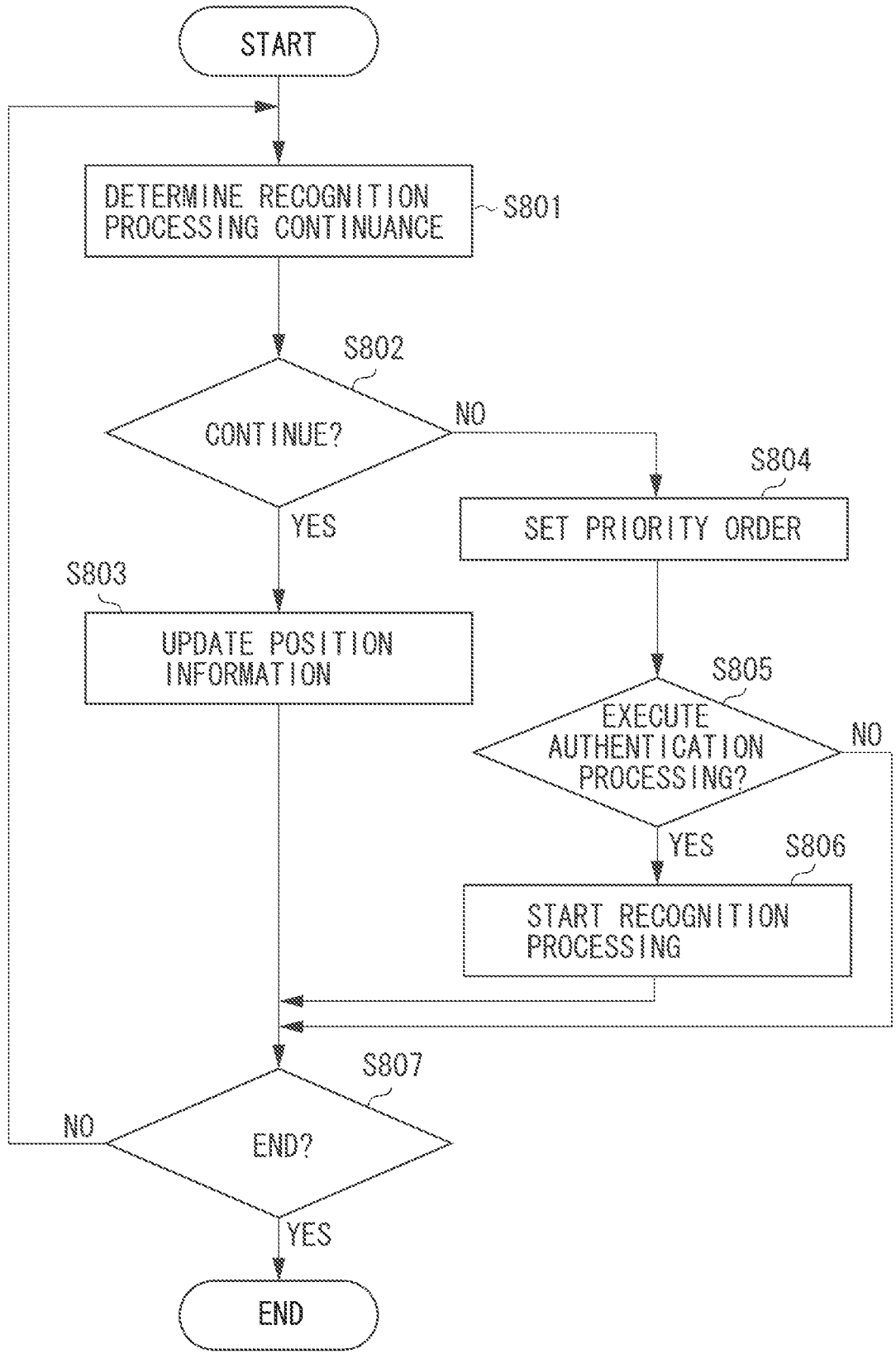
FIG. 8 is a flowchart illustrating a procedure of setting a priority order in a server according to the first exemplary embodiment.

FIG. 8 is a flowchart illustrating the priority order setting procedure carried out in the server 105. In step S801, the PTZ camera management unit 215 acquires information as to whether the recognition processing is being performed by the PTZ camera 103, whether the recognition processing has been successful, and the continuation time of the recognition processing, from the tracking information management unit 213.

In step S802, when it is determined that the recognition processing is being executed, the recognition processing has not been successful, and the recognition processing continuation time is shorter than elapsed time until the processing ends (YES in step S802), the currently executed recognition processing is continued. When the processing is continued, in step S803, the PTZ camera management unit 215 performs pan-tilt-zoom control of the PTZ camera 103 according to positional information of a current recognition target of the PTZ camera 103.

On the other hand, in the case other than the aforementioned condition, in step S804, the priority order determination unit 214 sets a priority order.

Then, in step S805, whether to execute recognition processing is determined based on the priority order setting. When it is determined that the recognition processing is executed (YES in step S805), in step S806, the PTZ camera management unit 215 issues a command to execute pan-tilt-zoom control and face detection recognition processing in the PTZ camera 103 according to positional information of a recognition target. Lastly, in step S807, whether to continue the processing is determined. When the processing is continued (YES in step S807), the processing returns to step S801. When not continued (NO in step S807), the processing is ended.

In the present exemplary embodiment, the number of PTZ cameras 103 is one. However, the number of PTZ cameras is not limited to one. Even in a system including more than one PTZ cameras, processing based on a similar priority order can be performed. In the present exemplary embodiment, the control of the PTZ camera 103 is performed by way of the pan-tilt-zoom. However, the control method of the camera is not limited to this. Digital pan-tilt-zoom control based on rotation, vertical and horizontal movement, and partial segmentation of an image can be performed.

Figure 9:
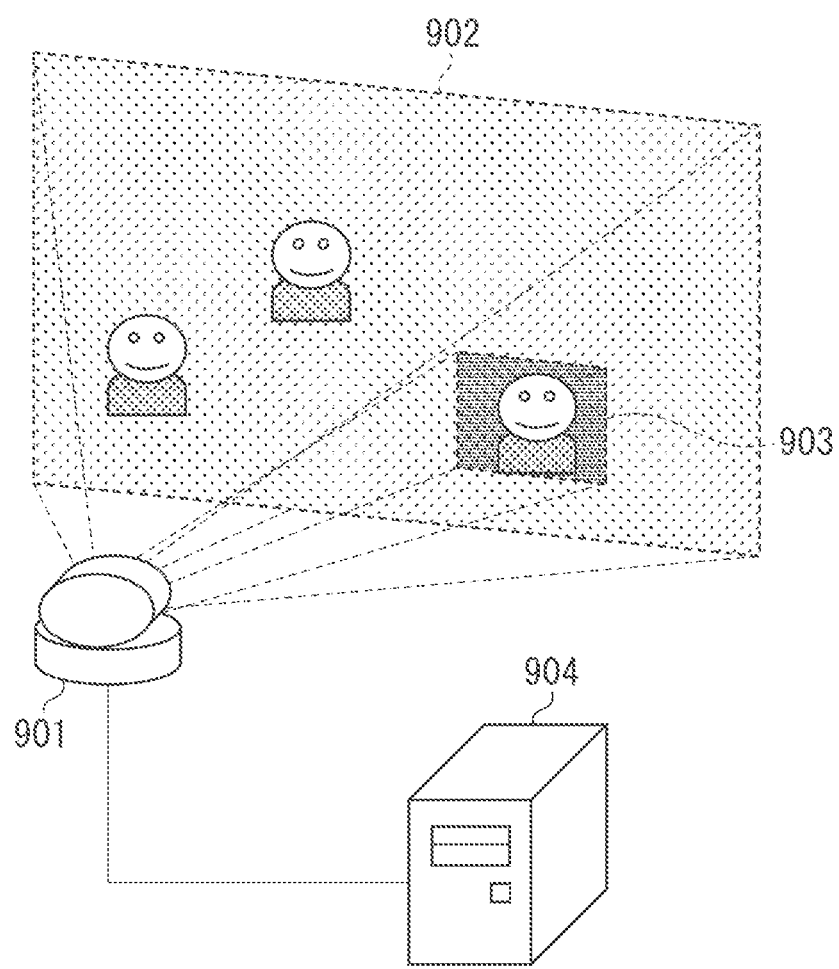
FIG. 9 is a diagram illustrating a surveillance camera system of a single camera according to a second exemplary embodiment.

FIG. 9 is a diagram illustrating an example of a surveillance camera system of a single camera according to a second exemplary embodiment. The surveillance camera system of the present exemplary embodiment includes a camera (PTZ camera) 901 capable of performing pan-tilt-zoom control, and a server 904 for controlling the PTZ camera 901.

A photographing region of the PTZ camera 901 at the time of wide angle setting is a wide angle photographing region 902, and a photographing region at the time of zoom setting is a zoom photographing region 903. The PTZ camera 901 normally performs photographing at the wide angle setting, and at the zoom setting when face detection recognition processing is executed.

Figure 10:
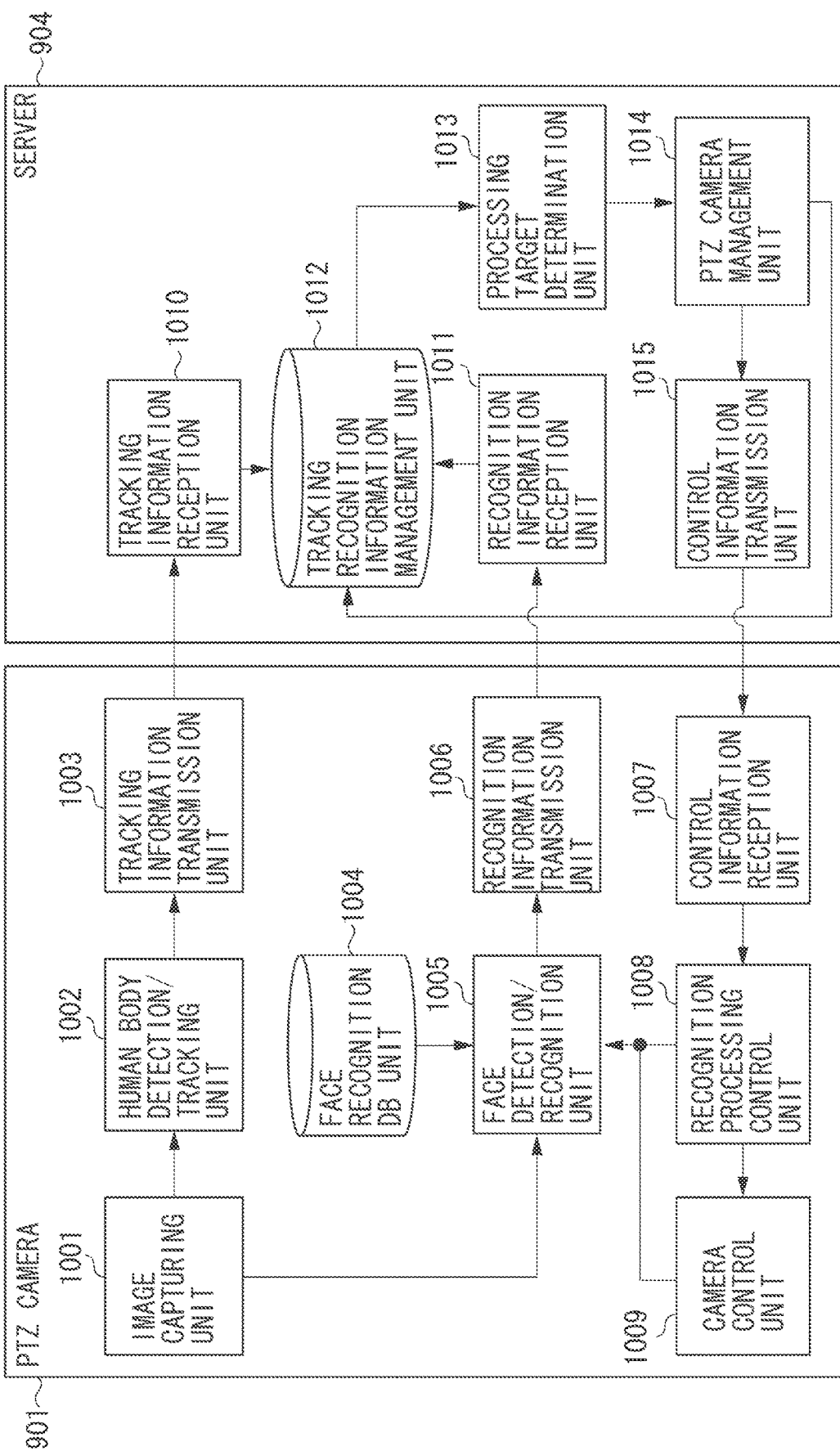
FIG. 10 is a block diagram illustrating a configuration example of the surveillance camera system of the single camera according to the second exemplary embodiment.

FIG. 10 is a block diagram illustrating a configuration example of the surveillance camera system according to the present exemplary embodiment.

The PTZ camera 901 includes an image capturing unit 1001, a human body detection/tracking unit 1002, and a tracking information transmission unit 1003. The PTZ camera 901 further includes a face recognition DB unit 1004, a face detection/recognition unit 105, a recognition information transmission unit 1006, a control information reception unit 1007, a recognition processing control unit 1008, and a camera control unit 1009.

The server 904 includes a tracking information reception unit 1010, a recognition information reception unit 1011, a tracking recognition information management unit 1012, a processing target determination unit 1013, a PTZ camera management unit 1014, and a control information transmission unit 1015.

In the PTZ camera 901, the image capturing unit 1001 captures an image of a surveillance region to create a continuous region image, and adds image ID for identifying each image to the created region image to output the region image to the human body detection/tracking unit 1002 and the face detection/recognition unit 1005.

The human body detection/tracking unit 1002 is similar to the human body detection/tracking unit 202 of the first exemplary embodiment.

However, human body detection/tracking by the human body detection/tracking unit 1002 is performed only when a command to execute human body processing is received from the recognition processing control unit 1008. The human body detection/tracking is not performed when no command to execute the human body processing is received.

The tracking information transmission unit 1003 is similar to the tracking information transmission unit 203 of the first exemplary embodiment.

The face recognition DB unit 1004 is similar to the face recognition DB unit 205 of the first exemplary embodiment.

The face detection/recognition unit 1005 is similar to the face detection/recognition unit 206 of the first exemplary embodiment.

However, face detection recognition by the face detection/recognition unit 1005 is performed only when a demand to execute the face processing is received from the recognition processing control unit 1008. The face detection recognition is not performed when no face processing execution command is received. No processing is performed during a period from reception of a PTZ control start command from the camera control unit 1009 until reception of a PTZ control end command.

The recognition information transmission unit 1006 transmits recognition information output from the face detection/recognition unit 1005 to the server 904 via a network. The processing of the recognition information transmission unit 1006, which transmits the recognition information from the PTZ camera 901 to the server 904, is not limited to any specific communication method such as LAN or serial communication.

The control information reception unit 1007 receives PTZ control information, and a command to execute human body processing or a command to execute face recognition processing from the server 904.

The recognition processing control unit 1008 outputs the human body processing execution command to the human body detection/tracking unit 1002 when the control information reception unit 1007 receives the human body processing execution command, and outputs a face processing execution command to the face detection/recognition unit 1005 when the control information reception unit 1007 receives the face processing execution command. The recognition processing control unit 1008 outputs the PTZ control command to the camera control unit 1009 when the control information reception unit 1007 acquires PTZ control information.

The camera control unit 1009 is similar to the camera control unit 210 of the first exemplary embodiment.

In the server 904, the tracking information reception unit 1010 receives tracking information from the PTZ camera 901, and the recognition information reception unit 1011 receives recognition information from the PTZ camera 901.

The tracking recognition information management unit 1012 manages tracking management information 1101 and processing history information 1111.

Figure 11:
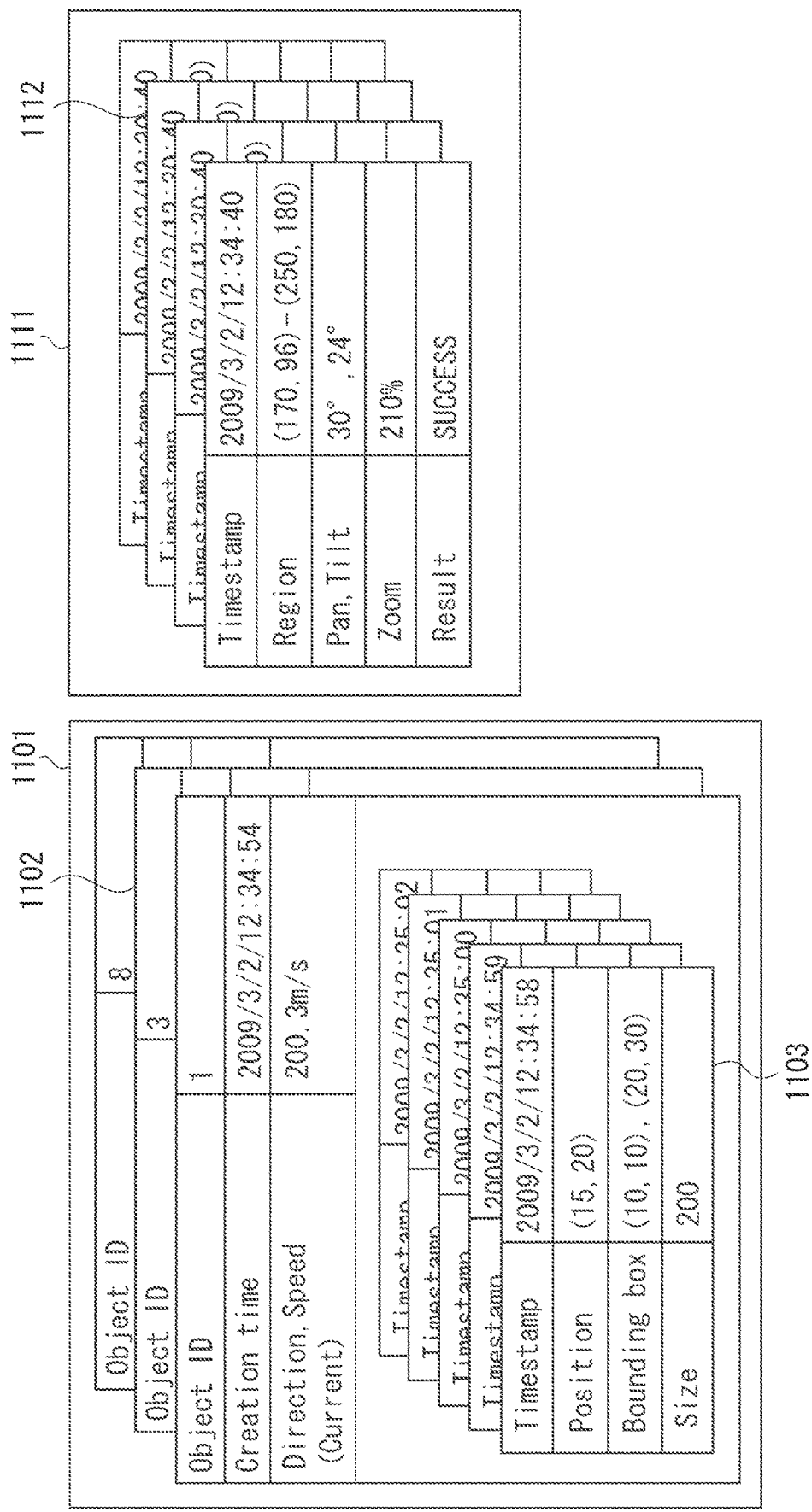
FIG. 11 is a diagram illustrating examples of tracking managing information and processing history information according to the second exemplary embodiment.

FIG. 11 illustrates an example of the tracking management information 1101 and the processing history information 1111.

The tracking management information 1101 manages person tracking information 1102 for each person tracking ID. The person tracking information 1102 includes person tracking ID, time when a person appears for the first time, a current moving direction and a moving speed, and one or more pieces of positional information 1103 illustrated in FIG. 11. Other information such as acceleration speed, a moving pattern, and a moving amount can also be used as motion information. The positional information 1103 includes a position of the person on the image captured by the PTZ camera 901 at the time of wide angle setting, a width/height and a size of a bounding box, and time of acquiring the information.

The tracking management information 1101 is updated for each time tracking information is acquired from the tracking information reception unit 1010. Specifically, when tracking information having person tracking ID that is not managed by the tracking management information 1101 is present, new person tracking information 1102 is created, and the time of first appearance, the current moving direction and moving speed, and the positional information 1103 are updated.

When tracking information having person tracking ID that is managed by the tracking management information 1101 is present, the current moving direction and moving speed, and the positional information 1103 are updated. On the other hand, when no tracking information having person tracking ID managed by the tracking management information 1101 is present, corresponding person tracking information 1102 is deleted. When a tracking information deletion command is received from the PTZ camera management unit 1014, the tracking management information 1101 is deleted.

The processing history information 1111 includes one or more pieces of processing information 1112. The processing information 1112 includes the time of executing face authentication processing, rectangular coordinates of a processing region on the image captured at the wide angle setting of the PTZ camera 901, a pan-tilt-zoom setting value, and a success/failure of a face authentication. In the processing history information 1111, processing information 1112 is added each time face authentication processing is executed under pan-tilt-zoom control of the PTZ camera 901. According to recognition information acquired from the recognition information reception unit 1011, a success is set to the face authentication result when the face detection is recognition processing successful and a person is specified. On the other hand, a failure is set to the face authentication result when a person is not specified.

The processing target determination unit 1013 determines a target to be subjected to face detection recognition processing by controlling the pan-tilt-zoom operation of the PTZ camera 901 after a point (Point•human) has been set on each person managed by the tracking management information 1101. The point on each person is set as follows. The point is determined referring to the tracking management information 1101 by a total score of points based on a moving direction (direction) and a moving speed (speed) for each person tracking ID, and a penalty based on the tracking management information 1101 and the processing history information 1111. The following expression is a calculation formula for point determination. In this case, a person of a highest point is set as a processing target.

$$Point_{human} = Point_{direction} + Point_{speed} + Point_{penalty}$$

A method for determining a moving direction and a moving speed and a method for determining a point with respect to the moving direction and the moving speed are similar to those of the first exemplary embodiment.

A penalty is −5 when current center coordinates of a human body are within a region where immediate face recognition processing has been performed. A penalty is −2 when the current center coordinates of the human body are within a region where in the past, face recognition processing has been performed two to five steps before. According to the sore calculation result, the person of a highest total value is subjected to face recognition processing under pan-tilt-zoom control of the PTZ camera 901.

In the present exemplary embodiment, the processing target is determined by setting the penalty based on the processing history information. However, the processing target determination is not limited to this method. The processing target determination method may be employed as long as past processing target history is taken into account. As a method for determining a processing target, priority may be given to a region where a probability of success is higher as a result of past face recognition processing.

In the server 904, the PTZ camera management unit 1014 manages a processing state of the PTZ camera 901. In the initial period of the present system, and when the processing target determination unit 1013 is yet to determine a processing target, a human body execution command and PTZ control information where an image is captured at wide angle setting are output to the control information transmission unit 1015.

On the other hand, after the processing target determination unit 1013 has determined a processing target, the following is performed. The PTZ camera photographing region 104 outputs PTZ control information and a face processing execution command in which pan-tilt-zoom is controlled such that a rectangle of a person can satisfy 80% of the photographing region, to the control information transmission unit 1015 based on a position and a rectangle of the positional information 1103 of the target person. Further, processing continuation time after determination of the processing target by the processing target determination unit 1013 is measured and managed.

When the processing continuation time exceeds preset end time, the PTZ camera photographing region 104 outputs a human body processing execution command and PTZ control information where an image is captured at wide angle setting, to the control information transmission unit 1015. Further, the PTZ camera photographing region 104 outputs a tracking information deletion command to the tracking recognition information management unit 1012.

In the present exemplary embodiment, the pan-tilt-zoom control is performed so that the rectangle region of the person when the target person is photographed can be 80% or more of the photographing region. However, the control is not limited to this. The pan-tilt-zoom control may be performed so as to acquire resolution sufficient for execution of face detection authentication processing.

The control information transmission unit 1015 transmits the PTZ control information created by the PTZ camera management unit 1014, and the face processing execution command, or the human body processing execution command to the PTZ camera 901.

Figure 12:
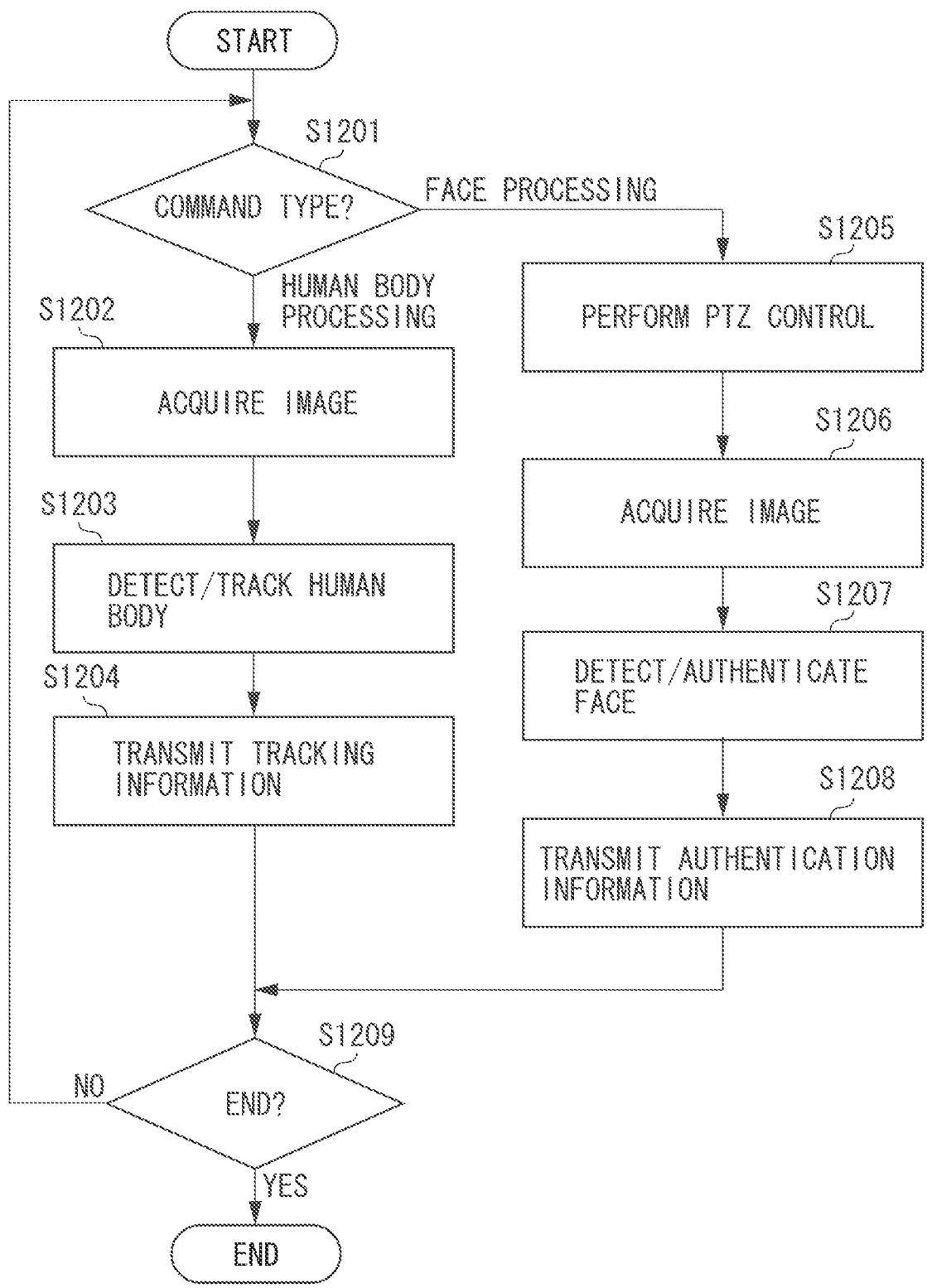
FIG. 12 is a flowchart illustrating an example of processing performed by a PTZ camera in the surveillance camera system using the single camera according to the second exemplary embodiment.

FIG. 12 is a flowchart illustrating a processing procedure performed in the PTZ camera 901.

In step S1201, human body processing and face processing are switched over according to a processing execution command output from the recognition processing control unit 1008. When the recognition processing control unit 1008 outputs a human body processing execution command, in step S1202, an image is acquired from the image capturing unit 1001.

Then, in step S1203, the human body detection/tracking unit 1002 performs detection and tracking processing of a human body based on the image.

In step S1204, the tracking information transmission unit 1003 transmits tracking information that is a tracking result of the human body detection and tracking processing performed by the human body detection/tracking unit 1002. On the other hand, when the recognition processing control unit 1008 outputs a face processing execution command, in step S1205, pan-tilt-zoom control is performed according to a PTZ control command. However, when no PTZ control command has been received, pan-tilt-zoom control is not performed.

In step S1206, the face detection/recognition unit 1005 acquires an image from the image capturing unit 1001. In step S1207, the face detection/recognition unit 1005 performs face detection and face authentication processing.

In step S1208, the recognition information transmission unit 1006 transmits a result of the face detection and face authentication processing performed in step S1207.

Lastly, in step S1209, whether to continue the processing is determined. When the processing is continued (YES in step S1209), the processing returns to step S1201. When not continued (NO in step S1209), the processing is ended.

Figure 13:
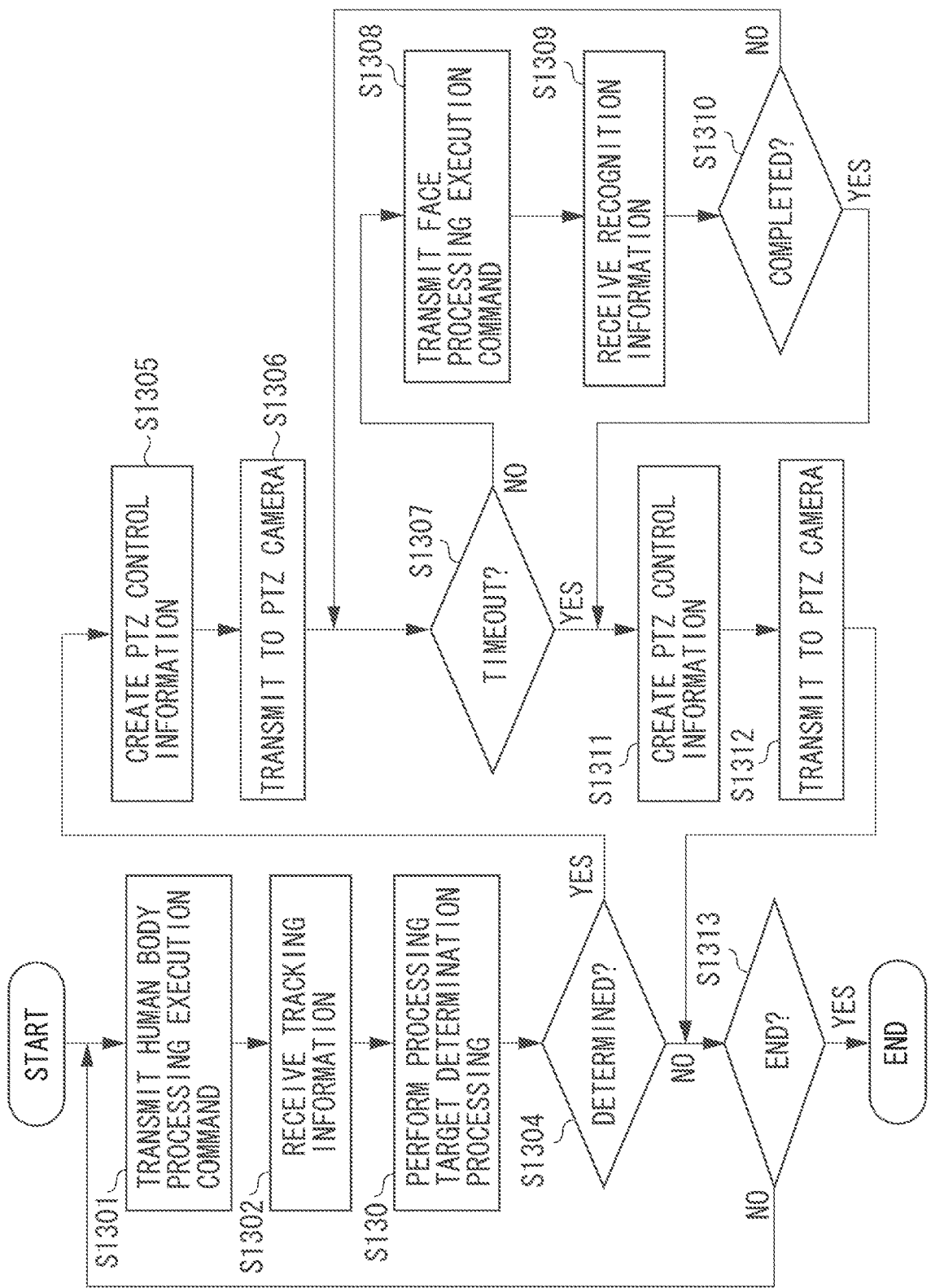
FIG. 13 is a flowchart illustrating a processing procedure of a server of the surveillance camera system using the single camera according to the second exemplary embodiment.

FIG. 13 is a flowchart illustrating the processing procedure carried out in the server 904.

At the time of starting the processing, the PTZ camera 901 performs video photographing at wide angle setting.

In step S1301, the PTZ camera management unit 1014 creates a human body processing execution command, and the control information transmission unit 1015 transmits the human body processing execution command to the PTZ camera 901.

Then, in step S1302, the processing waits for reception of tracking information from the PTZ camera 901. When the tracking information is received by the tracking information reception unit 1010, the tracking recognition information management unit 1012 updates the tracking management information 1101.

In step S1303, the processing target determination unit 1013 performs processing target determination. In step S1304, whether a processing target has been determined in step S1303 is decided. When it is determined that the processing target has been determined (YES in step S1304), in step S1305, the PTZ camera management unit 1014 creates a PTZ control command to perform pan-tilt-zoom control to zoom in on the processing target determined in the determination processing of step S1303.

In step S1306, the control information transmission unit 1015 transmits the PTZ control command to the PTZ camera 901.

In step S1307, the PTZ camera management unit 1014 measures processing continuation time after the outputting of the face processing execution command, and determines whether to end the processing. When the processing is continued (NO in step S1307), the processing proceeds to step S1308, and the control information transmission unit 1015 transmits the face processing execution command to the PTZ camera 901.

In step S1309, the processing waits for reception of recognition information from the PTZ camera 901. When the recognition information is received by the recognition information reception unit 1011, the tracking recognition information management unit 1012 updates the processing history information 1111.

Then, in step S1310, whether to continue the processing is determined. When the face detection processing is successful and a person is specified according to the recognition information, the processing proceeds to step S1311. The PTZ camera 1014 creates PTZ control information for photographing a video at wide angle setting.

In step S1312, the control information transmission unit 1015 transmits the PTZ control command to the PTZ camera 901.

In step S1313, whether to end the processing is determined. When the processing is continued (NO in step S1313), the processing returns to step S1301. When ended (YES in step S1313), the processing is ended.

On the other hand, when it is determined that the face detection recognition processing has failed according to the recognition information, the processing returns to step S1307, and the processing is continued.

In the present exemplary embodiment, the control of the PTZ camera 901 is the pan-tilt-zoom control. However, the control method of the camera is not limited to this method. Digital pan-tilt-zoom control based on rotation, vertical and horizontal movement, and partial segmentation of an image can also be performed.

The exemplary embodiments have been described in detail. In addition to the above-described exemplary embodiments, other exemplary embodiments can be implemented in forms such as a system, an apparatus, a method, and a program or a recording medium (storage medium).

Specifically, the exemplary embodiments can be applied to a system including a plurality of devices (e.g., host computer, interface device, image capturing device, and web application), and can also be applied to an apparatus including one device.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiment (s), and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

What is claimed is:

1. An information processing apparatus comprising:
   one or more processors; and
   a memory storing programs configured to be executed by the one or more processors, wherein the programs stored in the memory cause, when executed by the one or more processors, the one or more processors to operate to:
      obtain motion directions for each of a first plurality of objects detected from a first image captured by a first image capturing device;
      determine, from among the first plurality of objects detected from the first image, an object on which recognition processing is performed;
      associate, in a case where the recognition processing performed on the object determined from among the plurality of objects detected from the first image is failure, failure information indicating that the recognition processing is failure with a motion direction of the object;
      determine a target object on which the recognition processing is performed from among a second plurality of objects detected from a second image captured after the first image by the first image capturing device based on a score of each of the second plurality of objects, wherein the score is determined by the one or more processors based on the failure information and the associated motion direction so that a score of a first object whose motion direction in the second image falls within a predetermined range from a motion direction of an object in the first image on which the recognition processing is failure is lower than a score of a second object whose motion direction in the second image does not fall within the predetermined range in a condition where the moving speeds of the first and second objects in the second image are the same with each other; and
      perform the recognition processing on the target object in the second image which is captured by the first image capturing device.

2. The information processing apparatus according to claim 1, wherein the first image capturing device is a wide-angle camera or a pan-tilt-zoom (PTZ) camera.

3. The information processing apparatus according to claim 2, wherein the one or more processors further operate to:
   control a zoom magnification of a second image capturing device to obtain a zoomed image of the target object, and
   extract a feature amount of the target object in the zoomed image captured by the second image capturing device,
   wherein the recognition processing is to specify the target object in the zoomed image captured by the second image capturing device from an object stored in a database by comparison between the extracted feature amount of the target object in the zoomed image captured by the second image capturing device and a feature amount stored in the database.

4. The information processing apparatus according to claim 3, wherein the zoomed image is captured so that a rectangle of the target object satisfies a predetermined percentage of the zoomed image.

5. The information processing apparatus according to claim 3, wherein the zoom magnification of the second image is controlled to obtain the zoomed image of an abnormal region determined based on a score from among a plurality of abnormal regions in each of which one or more objects are detected from the second image.

6. The information processing apparatus according to claim 1, wherein the score is determined by the one or more processors so that the score of the first object is higher than a score of a third object detected from the second image in a case where moving directions of the first and third objects are the same with each other and a moving speed of the first object is lower than a moving speed of the third object.

7. The information processing apparatus according to claim 1, wherein the one or more processors update a moving direction and a moving speed in tracking information corresponding to an object in a case where the recognition processing on the object is failure.

8. A method for an information processing apparatus, the method comprising:
   obtaining motion directions for each of a first plurality of objects detected from a first image captured by a first image capturing device;
   determining, from among the first plurality of objects detected from the first image, an object on which recognition processing is performed;
   associating, in a case where the recognition processing performed on the object determined from among the plurality of objects detected from the first image is failure, failure information indicating that the recognition processing is failure with a motion direction of the object;
   determining a target object on which the recognition processing is performed from among a second plurality of objects detected from a second image captured after the first image by the first image capturing device based on a score of each of the second plurality of objects, wherein the score is determined by the one or more processors based on the failure information and the associated motion direction so that a score of a first object whose motion direction in the second image falls within a predetermined range from a motion direction of an object in the first image on which the recognition processing is failure is lower than a score of a second object whose motion direction in the second image does not fall within the predetermined range in a condition where the moving speeds of the first and second objects in the second image are the same with each other; and performing the recognition processing on the target object in the second image which is captured by the first image capturing device.

\* \* \* \* \*